A. S. Acker.
Pitman Box.
Nº 57,061.        Patented Aug. 14, 1866.
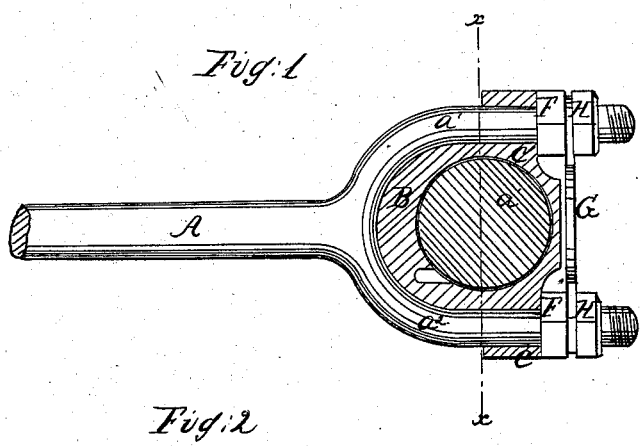
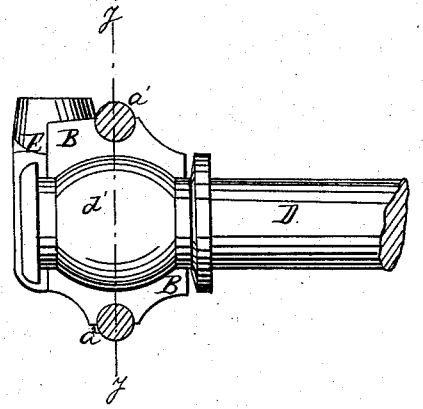 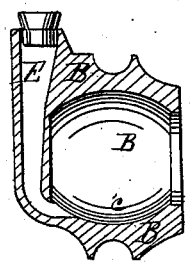
Witnesses
Inventor
A. S. Acker
Per Munn &Co
Attorneys

UNITED STATES PATENT OFFICE.

A. S. ACKER, OF ALBION, NEW YORK.

IMPROVEMENT IN PITMAN-BOXES.

Specification forming part of Letters Patent No. 57,061, dated August 14, 1866.

*To all whom it may concern:*

Be it known that I, A. S. ACKER, of Albion, in the county of Orleans and State of New York, have invented a new and useful Improvement in Pitman-Boxes for Harvesters; and I do hereby declare that the following is a full, clear, and exact description thereof, which will enable others skilled in the art to make and use the same, reference being had to the accompanying drawings, forming part of this specification, in which—

Figure 1 is a side view of the end of the pitman, with a section of the pitman-box and wrist-pin, through the line $y\ y$, Fig. 2. Fig. 2 is a view of a part of the pitman-box, partly in section, through the line $x\ x$, Fig. 1, showing the wrist-pin in place. Fig. 3 is the same view as Fig. 2, with the wrist-pin removed and part of the pitman-box broken away to show the oil-reservoir.

Similar letters of reference indicate like parts.

My invention is designed to prevent cramping and binding in the pitman-box, and the consequent breaking of the sickle-shank; and it consists in a pitman-box the bearing of which is hollowed out to fit around the ball formed on the wrist-pin, in combination with said wrist-pin, and in the combination, with the pitman-box, of a reservoir for the reception of the lubricating material, as hereinafter more fully described.

A is the pitman, the end of which divides into two branches, $a'$ and $a^2$, as shown in Fig. 1. Upon the ends of these branches $a'$ and $a^2$ are cut screw-threads, for the reception of the nuts which hold the box in its place.

The pitman-box is made in two parts, B and C. The lower part or bed, B, fits into the space between the branches $a'$ and $a^2$ of the pitman A. It has a channel or groove cut around it, as represented in Figs. 2 and 3, into which the branches $a'$ and $a^2$ of the pitman enter and keep the box in its place.

The surface of the bearing of the part B of the box is made concave, as represented in Figs. 1 and 3, so as to fit upon the ball $d'$ formed on the wrist-pin D. There is also formed in the part B a reservoir, E, for the lubricating material. The outside orifice or mouth of this reservoir may be closed with a screw, or in any other convenient manner.

The reservoir E is winding, and opens into the concavity of the part B in which the wrist-pin D works, as shown in Fig. 3. This reservoir I fill with lint, cotton-waste, or some other similar material saturated with the lubricating material, and the constant motion of the pitman keeps the bearings constantly lubricated.

The cap or part C of the pitman-box is made longer than the part B, as shown in Fig. 1, and has holes through its ends for the passage of the branches $a'$ and $a^2$ of the pitman A. The bearing of this part is also made concave, as shown in Fig. 1, so as to fit upon the ball $d'$ of the wrist-pin D. The cap or part C is kept in its place by the nuts F, as shown in Fig. 1. The joint is further stiffened and protected by the bar G passing over the ends of the branches $a'$ and $a^2$, and secured in place by nuts H.

By this invention binding or cramping between the wrist-pin and the pitman-box is prevented, thereby securing a free action to the cutters, and preventing the sickle-shank from being broken by any sudden strain on the pitman.

I claim as new and desire to secure by Letters Patent—

The combination of the cap C, as described, part B, with the reservoir E opening into the interior face thereof, the flanged ball $d'$, and the pitman A, arranged and operating in the manner and for the purpose specified.

A. S. ACKER.

Witnesses:
THOMAS BELL,
GEORGE W. BARRELL.